United States Patent
Russo et al.

(10) Patent No.: US 9,021,507 B2
(45) Date of Patent: Apr. 28, 2015

(54) DYNAMIC USE OF DATA ACROSS MULTIPLE PROGRAMS

(75) Inventors: Hanna Russo, Newton, MA (US); Margaret Mary O'Connell, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 1050 days.

(21) Appl. No.: 12/648,584

(22) Filed: Dec. 29, 2009

(65) Prior Publication Data

US 2011/0161989 A1    Jun. 30, 2011

(51) Int. Cl.
G06F 3/00    (2006.01)
G06F 9/54    (2006.01)

(52) U.S. Cl.
CPC .................................... *G06F 9/543* (2013.01)

(58) Field of Classification Search
None
See application file for complete search history.

(56) References Cited

U.S. PATENT DOCUMENTS

| | | | |
|---|---|---|---|
| 5,581,686 A | | 12/1996 | Koppolu et al. |
| 5,832,266 A | * | 11/1998 | Crow et al. ............... 719/316 |
| 6,988,109 B2 | | 1/2006 | Stanley et al. |
| 7,286,705 B2 | | 10/2007 | Geidl et al. |
| 7,818,458 B2 | * | 10/2010 | Andersen ................. 709/248 |
| 2004/0210846 A1 | * | 10/2004 | Olsen ....................... 715/761 |
| 2006/0148520 A1 | * | 7/2006 | Baker et al. ............ 455/556.2 |
| 2009/0327314 A1 | * | 12/2009 | Kim et al. ................ 707/100 |

OTHER PUBLICATIONS

Steven P. Reiss, "The Desert Environment", ACM Transactions on Software Engineering and Methodology, vol. 8, No. 4, Oct. 1999, pp. 297-342.
Reidar Conradi et al., "Version Models for Software Configuration Management," ACM Computing Surveys, vol. 30, No. 2, Jun. 1998, pp. 232-282.
Salvador Cavadini, "Secure Slices of Insecure Programs," ASIACCs '08 Mar. 18-20, Tokyo, Japan, pp. 112-122.

* cited by examiner

*Primary Examiner* — Gregory A Kessler
(74) *Attorney, Agent, or Firm* — Holland & Knight LLP; Brian J. Colandreo, Esq.; Jeffrey T. Placker, Esq.

(57) ABSTRACT

A method and computer program product for dynamic program integration is described. The method may comprise allowing, with at least one of a client electronic device and a server computer, selection of content in an original program. The method may further comprise applying a command sequence to the content. The method may also comprise copying the content on to a clipboard. Moreover, the method may activate a new program configured to handle the content. Additionally, the method may transfer the content from the clipboard to the new program and receive the content in the new program.

18 Claims, 4 Drawing Sheets

DYNAMIC USE OF DATA ACROSS MULTIPLE PROGRAMS

BACKGROUND OF THE INVENTION

This disclosure relates to dynamic program integration and, more particularly, to dynamic program integration in a desktop.

The same content may be displayed or used by different programs. For example, a person's name may be displayed in a simple text rendering program (e.g., Notepad™) and also used in a live instant message program. Similarly, an address may be displayed in a simple text rendering program and also used in a map application (e.g., Google Maps™). Accordingly, there may be a need for a dynamic program integration application which may allow the user to use the content in another application.

BRIEF SUMMARY OF THE INVENTION

In a first embodiment, a method may comprise allowing, with at least one of a client electronic device and a server computer, selection of content in an original program. The method may further comprise applying, with at least one of the client electronic device and the server computer, a command sequence to the content. The method may also comprise copying, with at least one of the client electronic device and the server computer, the content on to a clipboard. Furthermore, the method may comprise activating, with at least one of the client electronic device and the server computer, a new program configured to handle the content. Moreover, the method may comprise transferring, with at least one of the client electronic device and the server computer, the content from the clipboard to the new program. Additionally, the method may comprise receiving, with at least one of the client electronic device and the server computer, the content in the new program.

One or more of the following features may be included. The method may associate the new program with the content on the clipboard based upon, at least in part, a registry of content types. The method may also execute at least a portion of the new program while incorporating, at least in part, the content. The method may further allow selection of, from a plurality of programs, the new program configured to handle the content. In some implementations, the command sequence may correspond to the program configured to handle the content. Further, the command sequence may be a key stroke sequence.

In one implementation, the method may associate the new program with the content on the clipboard based upon, at least in part, a registry of keystroke combinations. The method may further detect when new content is added to the clipboard. The method may also pass the content through the new program as a parameter. Additionally, the method may call a REST API on the program and pass the content through the REST API as a parameter.

In another embodiment, a computer program product may reside on a computer-readable storage medium and may have a plurality of instructions stored on it. When executed by a processor, the instructions may cause the processor to perform operations comprising allowing, with at least one of a client electronic device and a server computer, selection of content in an original program. The operations may further comprise applying, with at least one of the client electronic device and the server computer, a command sequence to the content. The operations may also comprise copying, with at least one of the client electronic device and the server computer, the content on to a clipboard. Furthermore, the operations may comprise activating, with at least one of the client electronic device and the server computer, a new program configured to handle the content. Moreover, the operations may comprise transferring, with at least one of the client electronic device and the server computer, the content from the clipboard to the new program. Additionally, the operations may comprise receiving, with at least one of the client electronic device and the server computer, the content in the new program.

One or more of the following features may be included. The operations may associate the new program with the content on the clipboard based upon, at least in part, a registry of content types. The operations may also execute at least a portion of the new program while incorporating, at least in part, the content. The operations may further allow selection of, from a plurality of programs, the new program configured to handle the content. In some implementations, the command sequence may correspond to the program configured to handle the content. Further, the command sequence may be a key stroke sequence.

In some implementations, the operations may associate the new program with the content on the clipboard based upon, at least in part, a registry of keystroke combinations. The operations may further detect when new content is added to the clipboard. The operations may also pass the content through the new program as a parameter. Additionally, the operations may call a REST API on the program and pass the content through the REST API as a parameter.

The details of one or more implementations are set forth in the accompanying drawings and the description below. Other features and advantages will become apparent from the description, the drawings, and the claims.

DETAILED DESCRIPTION OF THE INVENTION

Figure 1:
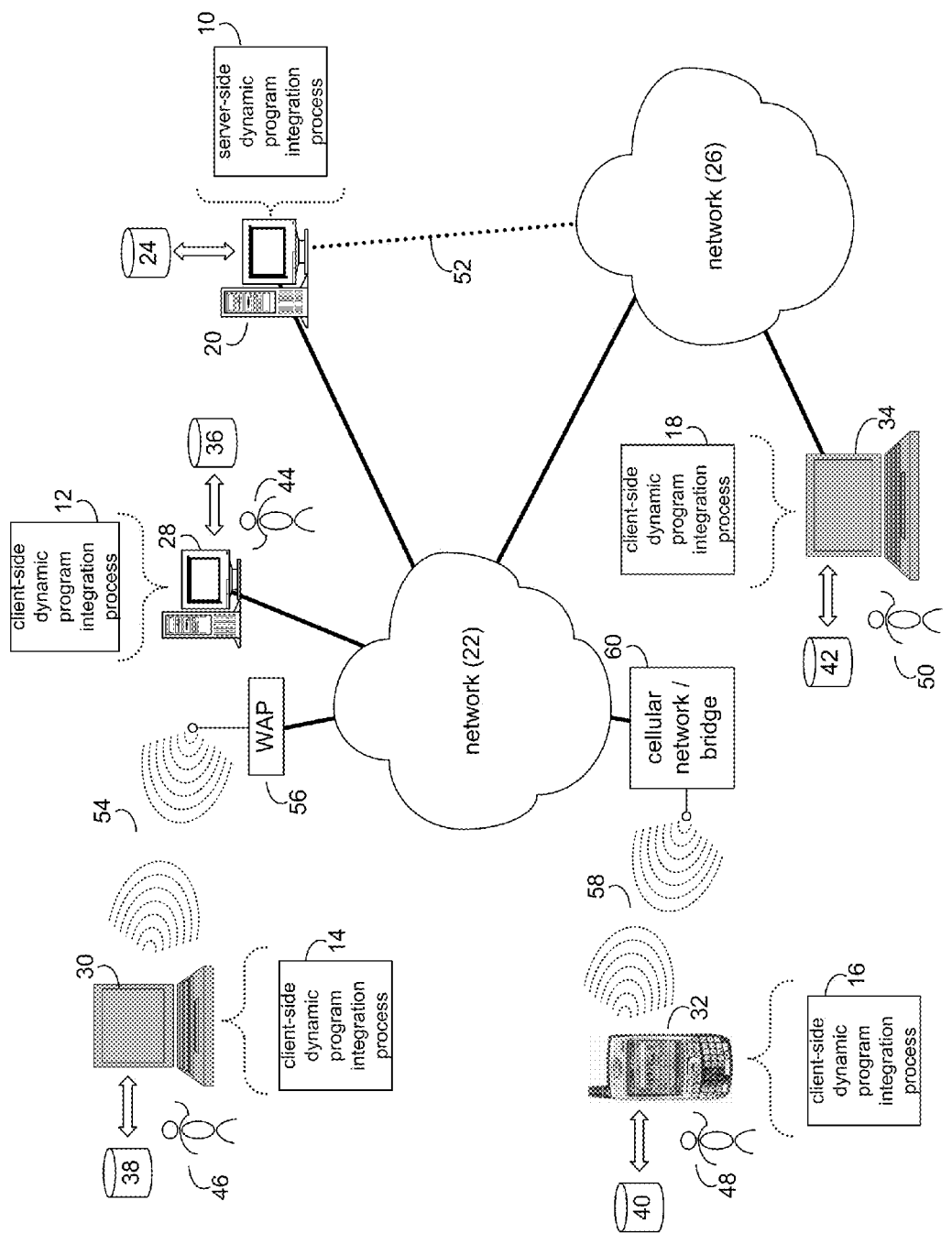
FIG. 1 is a diagrammatic view of a dynamic program integration process coupled to a distributed computing network.
Figure 2:
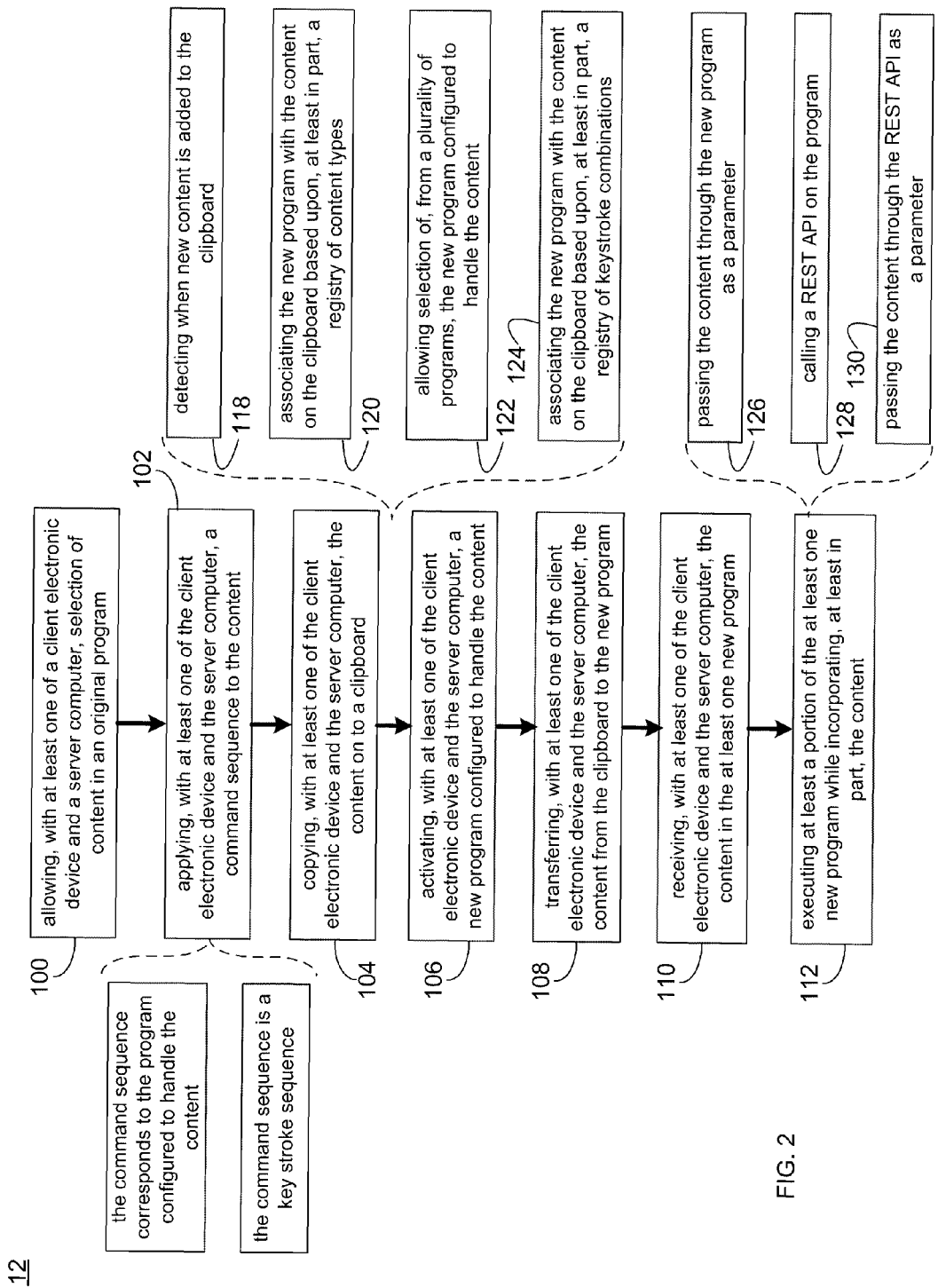
FIG. 2 is a flowchart of the dynamic program integration process of FIG. 1.

Referring to FIGS. 1 & 2, there is shown a dynamic program integration process 12. As will be discussed below, dynamic program integration process 12 may allow 100, with at least one of a client electronic device and a server computer, selection of content in an original program. A command sequence may be applied 102 with at least one of the client electronic device and the server computer.

The dynamic program integration (DPI) process may be a server-side process (e.g., server-side DPI process 10), a client-side process (e.g., client-side DPI process 12, client-side DPI process 14, client-side DPI process 16, or client-side DPI process 18), or a hybrid server-side/client-side process (e.g., the combination of server-side DPI process 10 and one or more of client-side DPI processes 12, 14, 16, 18).

Server-side DPI process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows XP Server™; Novell Netware™; or Redhat Linux™, for example.

The instruction sets and subroutines of server-side DPI process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS™, Novell Webserver™, or Apache Webserver™, that allows for access to server computer 20 (via network 22) using one or more protocols, examples of which may include but are not limited to HTTP (i.e., HyperText Transfer Protocol), SIP (i.e., session initiation protocol), and the Lotus Sametime™ VP protocol. Network 22 may be connected to one or more secondary networks (e.g., network 26), examples of which may include but are not limited to: a local area network; a wide area network; or an intranet, for example.

Client-side DPI processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft Windows™, Microsoft Windows CE™, Redhat Linux™, or a custom operating system.

The instruction sets and subroutines of client-side DPI processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side DPI processes 12, 14, 16, 18 and/or server-side DPI process 10 may be processes that run within (i.e., are part of) an operating system such as those mentioned above. Alternatively, client-side DPI processes 12, 14, 16, 18 and/or server-side DPI process 10 may be stand-alone applications that work in conjunction other installed programs or applications. One or more of client-side DPI processes 12, 14, 16, 18 and server-side DPI process 10 may interface with each other (via network 22 and/or network 26).

Users 44, 46, 48, 50 may access server-side DPI process 10 directly through the device on which the client-side DPI process (e.g., client-side DPI processes 12, 14, 16, 18) is executed, namely client electronic devices 28, 30, 32, 34, for example. Users 44, 46, 48, 50 may access server-side DPI process 10 directly through network 22 and/or through secondary network 26. Further, server computer 20 (i.e., the computer that executes server-side DPI process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Dynamic Program Integration Process

Client-side DPI process 12 may be incorporated into server-side DPI process 10 and may be executed within an operating system such as those mentioned above. However, this is not intended to be a limitation of this disclosure, as other configurations are possible (e.g., stand-alone, client-side DPI processes and/or stand-alone server-side DPI processes). DPI process 12 may be a stand alone application configured to work in conjunction with an operating system, such as those mentioned above. While client-side DPI process 12 is discussed below for illustrative purposes, the discussion below is equally applicable to server-side DPI process 10.

While using a computer, a user may see content in an application such as a simple text rendering program, and may wish to use the content with another program. Further, the user may wish to do so without having to command, each time, the computer to open the other program, enter the content, and execute the other program with the content. Accordingly, the user may need a dynamic program integration application which may allow the user to use the content in another application, without having to command, each time, the computer to open the other program, enter the content, and execute the other program with the content.

Figure 3:
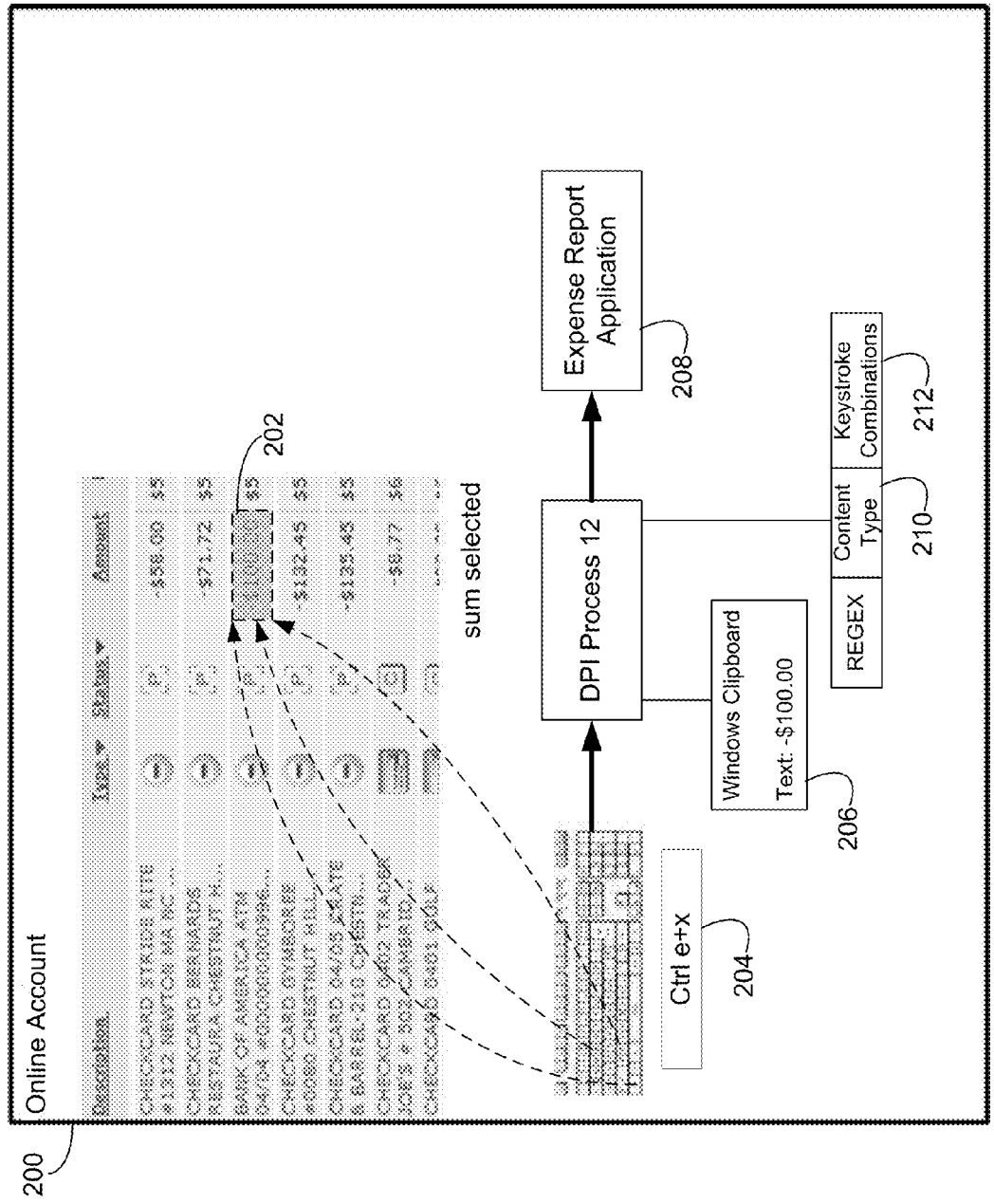
FIG. 3 is a diagrammatic flowchart of the dynamic integration process.

Referring now to FIGS. 1-3, DPI process 12 may allow 100, with at least one of a client electronic device (e.g., client electronic devices 28, 30, 32, 34) and a server computer (e.g., server computer 20), selection of content (e.g., content 202) in an original program (e.g., original application 200). While content 202 is shown as a dollar amount in FIG. 3, content 202 may be any type of content. For example, content 202 may be any text, including letters, numbers, words (e.g., a name and/or address), etc. shown on a display of a client electronic device and/or server computer, or any combination thereof. Further, content 202 maybe an image, picture, file or any type of object used in a client electronic device and/or server computer. Selection of content 202 may occur in the original program itself. Also, while original program 202 is shown as an online account program in FIG. 3, original program 202 may be any program or application used in a client electronic device and/or server computer, including but not limited to word processors, spreadsheets, internet applications, program development tools, email applications, instant messengers, presentation applications, etc. DPI process 12 may allow selection of content with any input device used with client electronic devices and/or server computers, including but not limited to mice, keyboards, touch screens, trackballs, etc.

Further, DPI process 12 may apply 102, with at least one of the client electronic device (e.g., client electronic devices 28, 30, 32, 34) and the server computer (e.g., server computer 20), a command sequence (e.g., command sequence 204) to the content (e.g., content 202). Command sequence 204 may be, for example, "Ctrl e+x" as shown in FIG. 3. Command sequence 204 may be initiated by a user, for example, by holding down the "Ctrl" and "e" and "x" keys on a standard keyboard. While command sequence 204 is shown as "Ctrl e+x", any letters, numbers, and other keys and/or symbols on a keyboard may be a command sequence, either independently or in combination. Further, while command sequence 204 is discussed above as being initiated by keys on a keyboard, command sequence 204 may be initiated using any of the other input devices discussed above. For example, command sequence 204 may be initiated by pressing one or more buttons on a mouse. In one embodiment, command sequence 204 may be initiated by right-clicking on a mouse while content 202 is selected, and then selecting command sequence 204 from a plurality of command sequences appearing in a pop-up menu rendered by DPI process 12.

DPI process 12 may copy 104, with at least one of the client electronic device (e.g., client electronic devices 28, 30, 32, 34) and the server computer (e.g., server computer 20), the content (e.g., content 202) on to a clipboard (e.g., clipboard 206). While clipboard 206 is shown in FIG. 3 as being a "Windows Clipboard", clipboard 206 may be a clipboard in any operating system such as those discussed above. Further, clipboard 206 may be an add-on or plug-in application for an operating system. For example, clipboard 206 may be an add-on or plug-in application for the operating system of a portable device such as a smart phone or data enabled mobile telephone. DPI process 12 may then activate 106, with at least one of the client electronic device (e.g., client electronic devices 28, 30, 32, 34) and the server computer (e.g., server computer 20), a new program (e.g., new program 208) configured to handle the content (e.g., content 202).

Prior to activating the new program, DPI process 12 may go through a number of operations in its various embodiments and implementations. For example, in one implementation, DPI process 12 may detect 118 when new content (e.g., content 202) is added to the clipboard. In another implementation, DPI process 12 may associate 120 the new program (e.g., new program 208) with the content (e.g., content 202) on clipboard 206 based upon, at least in part, a registry and/or system directory of content types and/or objects (e.g., registry 210). The registry of content types may include, but is not limited to names, addresses, screen names, email addresses, dollar amounts, pictures, images, video, audio, file extensions, file types, functions, parameters, account numbers, and/or telephone numbers. DPI process 12 may associate 120 the new program with the content type based upon, at least in part, the type of content the program is configured to handle. For example, and as shown in FIG. 3, if content 202 is a dollar amount, DPI process 12 may associate dollar amount content types with an expense report program and/or application (e.g., expense report application 208).

In one implementation DPI process 12 may allow 122 selection of, from a plurality of programs, the new program (e.g., new program 208) configured to handle the content. DPI process 12 may display a plurality of programs associated with the content type of content 202 and allow the user to select the new program that is to handle the content. DPI process 12 may display the plurality of programs in a pop-up menu and/or popup graphical user interface (GUI). Further, as discussed above, command sequence 204 may be initiated by right-clicking on a mouse while the content (e.g., content 202) is selected, and selecting command sequence 204 from a plurality of command sequences appearing in a pop-up menu rendered by DPI process 12. In one implementation, right-clicking on a mouse while the content is selected may render a pop-up window listing a plurality of new programs which may handle the content. Upon selection of one of the new programs, DPI process 12 may activate the selected new program, which may in turn handle the content, as described below.

In another implementation, DPI process 12 may associate 124 the new program with the content (e.g., content 202) on the clipboard (e.g., clipboard 206) based upon, at least in part, a registry of keystroke combinations (e.g., registry 212). For example, if command sequence 204 is "Ctrl e+x", as shown in FIG. 3, registry 212 may indicate to DPI process 12 that expense report application 208 is to handle content 202. Registry 212 may also include other commands, such as pressing one or more mouse buttons, which may also indicate to DPI process 212 which application is to handle content 202. In other words, expense report application 208 may be registered to activate when "Ctrl e+x" is pushed from the keyboard. Registry 212 may be configurable such that a user can enter a number of command sequences and/or keystroke combinations to indicate one or more applications to handle various content types. DPI process 12 may use a combination of the operations described above to decide which new program is to handle the selected content (e.g., content 202).

Consider for illustrative purposes the functionality in Windows Explorer™ where a user may open a file by double-clicking on the file with a mouse. Windows™ may call a program to open a file after the user double-clicks on the file because Windows™ may include a registry of file extensions to figure out which program to call to open the file. As discussed above, DPI process 12 may include a registry of objects to figure out which new program to activate to handle selected content (e.g., content 202). Further, DPI process 12 may use regular expressions technology (REGEX) to associate the new program with the type of object detected on the clipboard (e.g., name, image, link, address). A REGEX may be a piece of software, code, or a program, which may serve as a parser and/or examine strings of text (e.g., characters, words, or patterns of characters) to identify parts of it.

DPI process 12 may associate a number of new programs with the selected content. These new programs may be any programs installed on the client electronic device and/or server computer, or accessible by the client electronic device and/or server computer. DPI process 12 may also recognize participating software, which may be software, applications, or programs configured to operate with DPI process 12. Participating software may register with DPI process 12 to handle specific object types (e.g., content types) such as those described herein. DPI process 12 may provide a method which may be called to handle the content type (e.g., a person's name). As discussed below, DPI process 12 may provide a REST API which may take the person's name as a parameter.

As mentioned above, DPI process 12 may activate 106, with at least one of the client electronic device (e.g., client electronic devices 28, 30, 32, 34) and the server computer (e.g., server computer 20), a new program (e.g., new program 208) configured to handle the content (e.g., content 202). While selection of the new program from a plurality of programs listed in a popup menu or GUI is mentioned above, DPI process 12 may activate the new program without such selection of the new program. For example, and as discussed above, DPI process 12 may use registry 210 and/or registry 212 to indicate which new program it should activate, and may activate the program without selection from a plurality of programs listed in a popup menu or GUI. Activating the new program may include opening the new program, toggling to the new program if it is already open, and/or installing the new program.

Moreover, DPI process 12 may transfer 108, with at least one of the client electronic device (e.g., client electronic devices 28, 30, 32, 34) and the server computer (e.g., server computer 20), the content (e.g., content 202) from the clipboard (e.g., clipboard 206) to the new program (e.g., new program 208). DPI process 12 may also receive 110, with at least one of the client electronic device (e.g., client electronic devices 28, 30, 32, 34) and the server computer (e.g., server computer 20), the content (e.g., content 202) in the new program (e.g., new program 208). For example, DPI process 12 may take content 202 from clipboard 202 and place (e.g., paste, enter, etc.) content 202 into expense report application 208. Content 202 may be placed in a field of expense report application 208, may be passed through a function and/or subroutine of expense report application 208 as a parameter, or may be otherwise made available to expense report 208. In another example, if content 202 is a physical address, DPI process 12 may place content 202 in an "address" and/or "location" field in a map application (e.g., Google Maps™). Further, if content 202 were a person's name, or a screen name, DPI process 12 may place content 202 in a field of an instant messaging application designating who an instant message will be sent to.

In one embodiment, DPI process 12 may call 128 a REST API on the new program. A REST API may be a web service which may be implemented using HTTP. DPI process 12 may pass 130 the content (e.g., content 202) through the REST API as a parameter. A resource may be referenced in a uniform resource identifier (URI). The REST API may allow for sending an HTTP GET or POST to call exposed methods, and may return, for example, an XML document. Calling a REST API may require an API key, which may be listed in a registry or be otherwise accessible by DPI process 12.

DPI process 12 may also execute 112 at least a portion of the program (e.g., new program 208) while incorporating, at least in part, the content (e.g., content 202). Continuing with the above examples, and as shown in FIG. 3, DPI process 12 may command expense report application 208 to execute (e.g., run, create) an expense report using content 202. If content 202 is a physical address, DPI process 12 may execute (e.g., run, search) Google Maps™ with the physical address as the location. Further, if content 202 were a person's name, or a screen name, DPI process 12 execute (e.g., open, send) an instant messaging application with the person's name and/or screen name designated as the recipient of the instant message. It should be noted that DPI process 12 may execute 112 at least a portion of new program 208 while incorporating, at least in part, content 202, without further input from the user.

For example, and continuing with the Google Maps™ example from above, if content 202 is a physical address, DPI process 12 may place content 202 in an "address" and/or "location" field in the Google Maps™ web application. Usually, rendering a map showing the physical address would require pressing the "search maps" button in the Google Maps™ web application. However, DPI process 12 may execute the Google Maps™ search of the physical address automatically, without the user pressing the "search maps" button.

It should also be noted that use of DPI process 12 as part of an operating system and/or as a stand alone application working in conjunction with an operating system may not require alteration of either the original program or the new program. In other words, DPI process 12 may conduct any of the operations and/or methods discussed herein without having to alter the code of either the original program or the new program (e.g., the participating software). It should also be noted that DPI process 12 may conduct any of the operations and/or methods discussed herein without requiring the content to be associated with a link and/or hyperlink embedded in the content. In this way, DPI process 12 may make any "static" text in a program and/or application "live" for use in a new program, and may thereby integrate a number of applications without requiring those applications to be altered.

Figure 4:
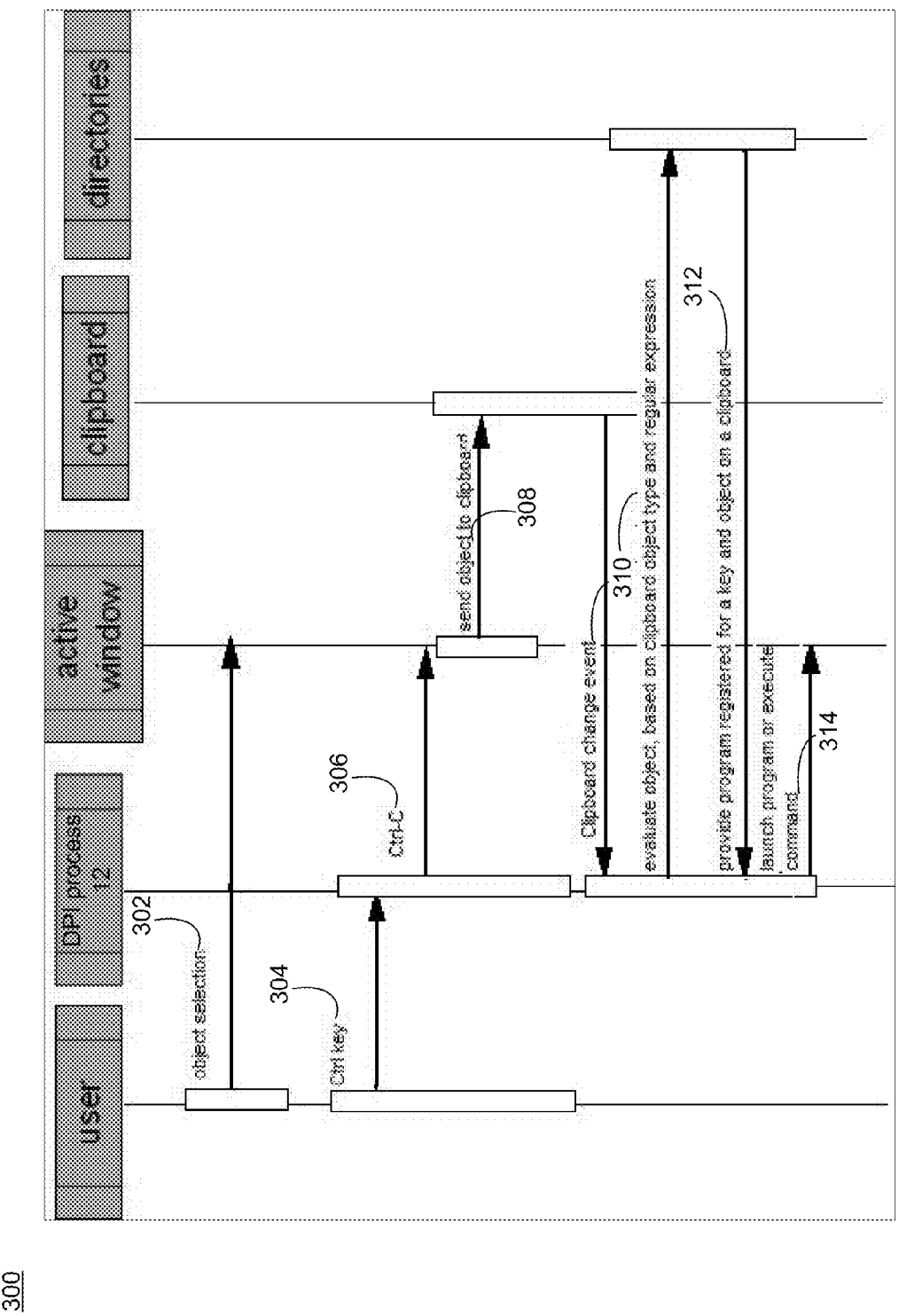
FIG. 4 is a sequence diagram of the dynamic integration process.

Referring now to FIG. 4, and in one implementation, for example, the user may be operating in the active window and may select 302 an object. The user may then execute 304 a Ctrl key sequence. DPI process 12 may include a keyboard listener to pick up this Ctrl key sequence, and may then execute 306 a "Ctrl+C" for an active window. This may cause the user-selected object to be copied (i.e., sent) 308 to a system clipboard. DPI process 12, which may include a clipboard change event listener, may evaluate 310 the object on the clipboard using object type and/or regular expression (REGEX). DPI process 12 may then use a system directory to figure out which program may be registered to handle the object on the clipboard, and may launch the program to handle the user request. The system directory may provide 312 a program registered for a key and object on the clipboard. DPI process 12 may launch 314 the program, which may become the active window. Depending how the program may be registered in the system directory, DPI process 12 may pass the object to the program. For example, a REST API could be called on the program with the object passed as a parameter.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:
1. A method comprising:
allowing, with at least one of a client electronic device and a server computer, selection of content in an original program;
applying, with at least one of the client electronic device and the server computer, a command sequence to the content;
copying, with at least one of the client electronic device and the server computer, the content on to a clipboard, based upon, at least in part, applying the command sequence to the content;
activating, with at least one of the client electronic device and the server computer, a new program configured to handle the content, based upon, at least in part, applying the command sequence to the content;
transferring, with at least one of the client electronic device and the server computer, the content from the clipboard to the new program, based upon, at least in part, applying the command sequence to the content;
receiving, with at least one of the client electronic device and the server computer, the content in the new program, based upon, at least in part, applying the command sequence to the content; and automatically executing, with at least one of the client electronic device and the server computer, at least a portion of the new program, including directly using, at least in part, the content.

2. The method of claim 1 further comprising:
associating the new program with the content on the clipboard based upon, at least in part, a registry of content types.

3. The method of claim 1 further comprising:
allowing selection of, from a plurality of programs, the new program configured to handle the content.

4. The method of claim 1 wherein the command sequence corresponds to the program configured to handle the content.

5. The method of claim 1 wherein the command sequence is a keystroke sequence.

6. The method of claim 5 further comprising:
associating the new program with the content on the clipboard based upon, at least in part, a registry of keystroke combinations.

7. The method of claim 1 further comprising:
detecting when new content is added to the clipboard.

8. The method of claim 1 further comprising:
passing the content through the new program as a parameter.

9. The method of claim 1 further comprising:
calling a REST API on the program;
passing the content through the REST API as a parameter.

10. A computer program product residing on a computer-readable storage medium having a plurality of instructions stored thereon, which, when executed by a processor, cause the processor to perform operations comprising:
allowing, with at least one of a client electronic device and a server computer, selection of content in an original program;
applying, with at least one of the client electronic device and the server computer, a command sequence to the content;
copying, with at least one of the client electronic device and the server computer, the content on to a clipboard, based upon, at least in part, applying the command sequence to the content;
activating, with at least one of the client electronic device and the server computer, a new program configured to handle the content, based upon, at least in part, applying the command sequence to the content;
transferring, with at least one of the client electronic device and the server computer, the content from the clipboard to the new program, based upon, at least in part, applying the command sequence to the content;
receiving, with at least one of the client electronic device and the server computer, the content in the new program, based upon, at least in part, applying the command sequence to the content; and
automatically executing, with at least one of the client electronic device and the server computer, at least a portion of the new program, including directly using, at least in part, the content.

11. The computer program product of claim 10 further comprising instructions for:
associating the new program with the content on the clipboard based upon, at least in part, a registry of content types.

12. The computer program product of claim 10 further comprising instructions for:
allowing selection of, from a plurality of programs, the new program configured to handle the content.

13. The computer program product of claim 10 wherein the command sequence corresponds to the program configured to handle the content.

14. The computer program product of claim 10 wherein the command sequence is a keystroke sequence.

15. The computer program product of claim 14 further comprising instructions for:
associating the new program with the content on the clipboard based upon, at least in part, a registry of keystroke combinations.

16. The computer program product of claim 10 further comprising instructions for:
detecting when new content is added to the clipboard.

17. The computer program product of claim 10 further comprising instructions for:
passing the content through the new program as a parameter.

18. The computer program product of claim 10 further comprising instructions for:
calling a REST API on the program;
passing the content through the REST API as a parameter.

* * * * *